US011597168B2

(12) United States Patent
Kawabe et al.

(10) Patent No.: US 11,597,168 B2
(45) Date of Patent: Mar. 7, 2023

(54) THIN-LAYER TAPE AUTOMATED LAMINATION METHOD AND DEVICE

(71) Applicant: FUKUI PREFECTURAL GOVERNMENT, Fukui (JP)

(72) Inventors: Kazumasa Kawabe, Fukui (JP); Kohei Yamada, Fukui (JP); Keiichi Kondo, Fukui (JP); Hirofumi Iyo, Fukui (JP); Shin Kaechi, Fukui (JP)

(73) Assignee: FUKUI PREFECTURAL GOVERNMENT, Fukui (JP)

( * ) Notice: Subject to any disclaimer, the term of this patent is extended or adjusted under 35 U.S.C. 154(b) by 137 days.

(21) Appl. No.: 16/648,331

(22) PCT Filed: Oct. 3, 2019

(86) PCT No.: PCT/JP2019/039049
§ 371 (c)(1),
(2) Date: Mar. 18, 2020

(87) PCT Pub. No.: WO2020/071466
PCT Pub. Date: Apr. 9, 2020

(65) Prior Publication Data
US 2021/0206122 A1    Jul. 8, 2021

(30) Foreign Application Priority Data
Oct. 5, 2018  (JP) .............................. JP2018-189770
Oct. 5, 2018  (JP) .............................. JP2018-189771

(51) Int. Cl.
B29C 70/38   (2006.01)
B29C 70/34   (2006.01)
B29C 70/54   (2006.01)

(52) U.S. Cl.
CPC .............. B29C 70/38 (2013.01); B29C 70/34 (2013.01); B29C 70/386 (2013.01); B29C 70/545 (2013.01)

(58) Field of Classification Search
None
See application file for complete search history.

(56) References Cited

U.S. PATENT DOCUMENTS

2006/0162143 A1*  7/2006  Nelson ................ B32B 38/1808
                                                  29/430
2006/0180270 A1   8/2006  Ledet et al.
2010/0006205 A1   1/2010  McCowin et al.

FOREIGN PATENT DOCUMENTS

JP      10-244596 A     9/1998
JP      5736560 B2      6/2015
(Continued)

OTHER PUBLICATIONS

Sunao Sugimoto et al., "Mechanical Properties of Thin Ply CFRP With High Cai Strength", 13th Japan International Sample Symposium and Exhibition, Dec. 8, 2015, pp. 1-5.
(Continued)

Primary Examiner — Barbara J Musser
(74) Attorney, Agent, or Firm — Sughrue Mion, PLLC

(57) ABSTRACT

The present invention is intended to provide automated lamination method and device that can efficiently perform automated lamination by using a thin-layer tape. A thin-layer tape automated lamination device 1 includes a provisional formation unit 2 configured to form lamination tapes having thicknesses different from each other by laminating a plurality of thin-layer tapes each having a thickness of 5 μm to 80 μm, and a lamination-shaping unit 3 configured to laminate and shape each formed lamination tape in a lamination region of a basal body surface.

4 Claims, 12 Drawing Sheets

(56) References Cited

FOREIGN PATENT DOCUMENTS

| JP | 2017-31342 A | 2/2017 | | |
|---|---|---|---|---|
| JP | 2017-47572 A | 3/2017 | | |
| JP | 2017-61140 A | 3/2017 | | |
| WO | WO-2011100977 A1 * | 8/2011 | ........... | B29C 70/386 |
| WO | 2014/175798 A1 | 10/2014 | | |

OTHER PUBLICATIONS

Extended European Search Report dated Nov. 16, 2021 in European Application No. 19869680.9.
Dan Spurr, "Thin Ply Prepregs", Professional Boat Builder Magazine, 2017, XP002804608, Retrieved from : URL: <https://www.proboat.com/2017/09/thin-ply-prepregs/> (5 pages total).
International Search Report dated Dec. 17, 2019 in International Application No. PCT/JP2019/039049.

* cited by examiner

FIG. 21A
FIG. 21B
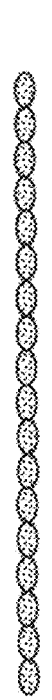
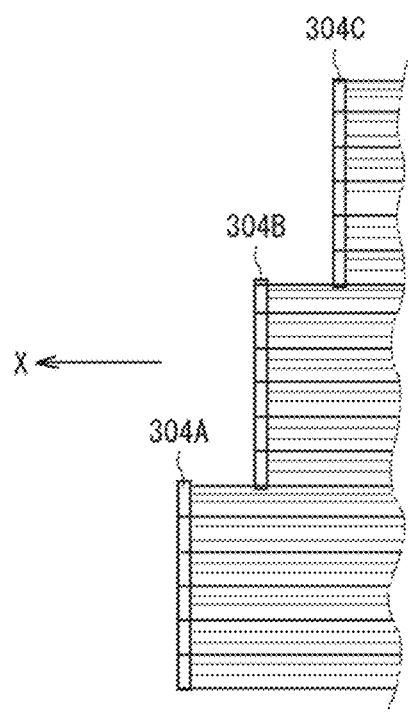
FIG. 22
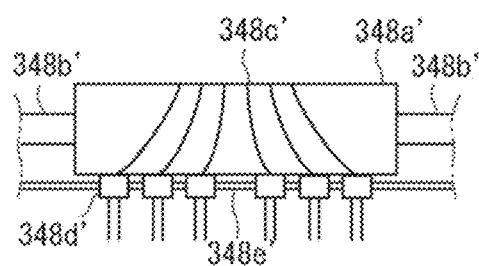

THIN-LAYER TAPE AUTOMATED LAMINATION METHOD AND DEVICE

CROSS REFERENCE TO RELATED APPLICATIONS

This application is a National Stage of International Application No. PCT/JP2019/039049 filed Oct. 3, 2019, claiming priority based on Japanese Patent Application No. 2018-189770, filed Oct. 5, 2018 and Japanese Patent Application No. 2018-189771 filed Oct. 5, 2018.

TECHNICAL FIELD

The present invention relates to automated lamination method and device that laminate thinly formed thin-layer tapes into a desired shape.

BACKGROUND ART

A fiber reinforcement composite material made of a reinforcement fiber material and a resin material has excellent characteristics such as lightweight, high strength, and high elasticity and is used in various fields of aircraft, automobile, sport instrument, and the like. The fiber reinforcement composite material is fabricated in a prepreg form in which the reinforcement fiber material and the resin material are integrated, and is used in shaping fabrication, and in a known fabrication technology, a prepreg laminated body is acquired by laminating a plurality of prepreg layers in accordance with the shape of a shaped product and then is shaped through heating pressurization to manufacture the shaped product.

Automated lamination technologies such as automated fiber placement (AFP) and automated tape layer (ATL) have been developed as prepreg lamination technologies, and it is possible to achieve a technology of manufacturing a shaped product with increased cost effect by introducing such an automation process.

The present inventors have developed technologies related to opening processing for a carbon fiber bundle as a reinforcement fiber material, and have developed a thin-layer prepreg tape obtained by forming a fiber bundle such as carbon fiber into a thin layer of a tape shape by opening and combined with a resin material. Then, the present inventors have researched and developed technologies related to lamination-shaping of such a thin-layer prepreg tape (refer to Patent Literature 1 and Non Patent Literature 1), and have found that a laminated body obtained by laminating and shaping such thin-layer prepreg tapes has significantly improved mechanical characteristics such as an impact resistance characteristic as compared to a laminated body having the same thickness and obtained by laminating and shaping prepreg tapes having a normal thickness.

CITATION LIST

Patent Literature

Patent Literature 1: Japanese Patent No. 5736560

Non Patent Literature

Non Patent Literature 1: Sunao Sugimoto et al, "MECHANICAL PROPERTIES OF THIN PLY CFRP WITH HIGH CAI STRENGTH", 14TH JAPAN INTERNATIONAL SAMPE SYMPOSIUM AND EXHIBITION, Dec. 8, 2015.

SUMMARY OF INVENTION

Technical Problem

As for a laminated body obtained by laminating and shaping thin-layer prepreg tapes, for example, a laminated body obtained by laminating three thin-layer prepreg tapes each having a thickness of 40 μm has a thickness substantially equal to that of a conventional prepreg tape having a thickness of 120 μm, but the laminated body is more excellent in mechanical characteristics as described above, which has been confirmed by experiment data and the like. Such mechanical characteristic improvement is mainly because reinforcement fibers in the laminated body are aligned for each thin-layer prepreg tape and thus have improved straightness.

However, when automation processes such as AFP and ATL are performed by using such thin-layer prepreg tapes, the fabrication time is increased due to increase of the number of laminated tapes.

Thus, the present invention is intended to provide automated lamination method and device that can efficiently perform automated lamination by laminating thin-layer tapes.

Solution to Problem

A thin-layer tape automated lamination method according to the present invention includes: a supply step of supplying a plurality of thin-layer tapes each having a thickness of 5 μm to 80 μm; and a lamination-shaping step of laminating and shaping the supplied thin-layer tapes in a lamination region of a basal body surface. The thin-layer tapes include a thin-layer prepreg tape having a thickness of 20 μm to 80 μm in a resin impregnation state. The thin-layer tapes include a resin tape having a thickness of 5 μm to 20 μm. The supply step includes a provisional formation step of forming a lamination tape by entirely or partially laminating the thin-layer tapes, and the lamination-shaping step laminates and shapes the formed lamination tape in the lamination region of the basal body surface. The provisional formation step forms the lamination tapes having thicknesses different from each other by cutting each thin-layer tape at a predetermined length and laminating the cut thin-layer tape. The provisional formation step forms the lamination tape by laminating the thin-layer prepreg tapes and the resin tapes. The lamination-shaping step sequentially laminates one or a plurality of the thin-layer tapes and one or a plurality of the lamination tapes supplied from the supply step in the lamination region of the basal body surface in an overlapping manner in a lamination operation direction, and integrates and shapes the laminated thin-layer tapes and lamination tapes. The lamination-shaping step cuts and laminates the lamination tapes and the thin-layer tapes. The lamination-shaping step cuts and laminates the lamination tapes and the thin-layer tapes so that cutting positions of the lamination tapes and the thin-layer tapes are not overlapped with each other in a thickness direction. The thin-layer tape automated lamination method further includes a conveyance process of conveying, to the lamination-shaping step, the lamination tape supplied from the supply step, and the conveyance process adjusts conveyance of the lamination tape in accordance with a lamination operation in the lamination-shaping step.

A thin-layer tape automated lamination device according to the present invention includes: a supply unit configured to supply a plurality of thin-layer tapes each having a thickness of 5 µm to 80 µm; and a lamination-shaping unit configured to laminate and shape the supplied thin-layer tapes in a lamination region of a basal body surface. The supply unit includes a provisional formation unit configured to form a lamination tape by entirely or partially laminating the thin-layer tapes, and the lamination-shaping unit laminates and shapes the formed lamination tape in the lamination region of the basal body surface. The provisional formation unit includes a cutting unit configured to cut each thin-layer tape to be laminated at a predetermined length. The lamination-shaping unit includes a plurality of tape lamination units arrayed in a lamination operation direction, and the thin-layer tapes and/or the lamination tapes supplied from the supply unit are introduced to the respective tape lamination units. The thin-layer tape automated lamination device further includes a conveyance unit configured to adjust conveyance of the lamination tape formed by the provisional formation unit in accordance with a lamination operation of the lamination-shaping unit and convey the lamination tape to the lamination-shaping unit.

Advantageous Effects of Invention

The present invention can efficiently perform lamination by supplying and laminating a plurality of thin-layer tapes. In addition, it is possible to perform fine lamination by changing the thickness of a lamination tape in accordance with a product shape through automated lamination using the lamination tape, the lamination tape being obtained by laminating a plurality of thin-layer tapes in advance.

BRIEF DESCRIPTION OF DRAWINGS

FIG. 21A and FIG. 21B are an explanatory diagram related to a lamination operation with lamination position adjustment.

FIG. 22 is a schematic configuration diagram illustrating an exemplary mechanism configured to adjust lamination positions of a plurality of thin-layer tapes arrayed in a width direction.

DESCRIPTION OF EMBODIMENTS

Embodiments of the present invention will be described in detail below. The embodiments described below are preferable specific examples when the present invention is performed, and thus have various kinds of technological limitation, but the present invention is not limited to these embodiments unless otherwise stated in the following description.

Figure 1:
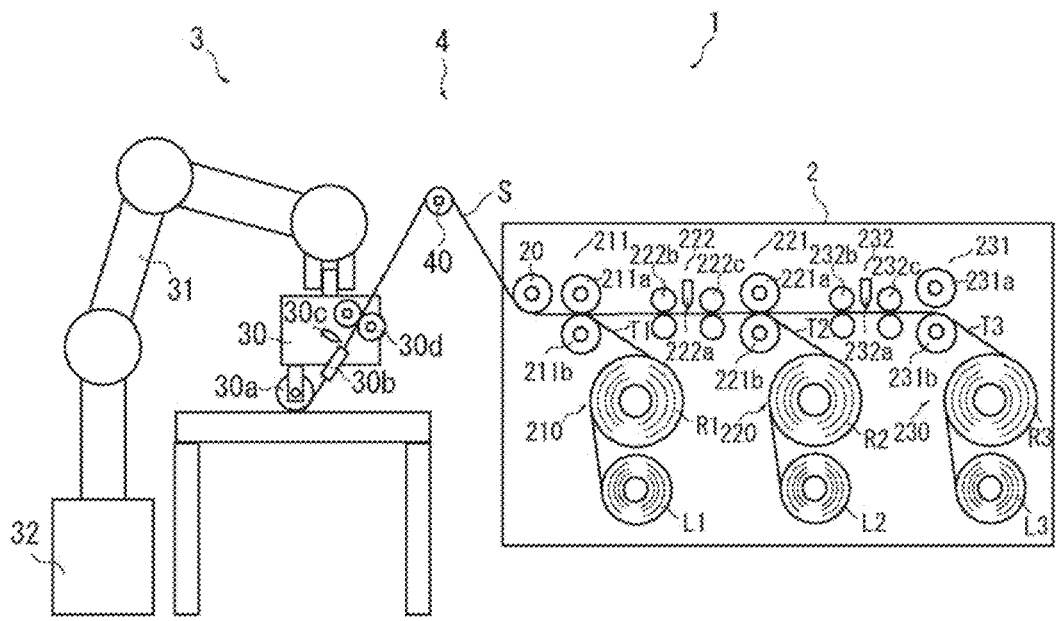
FIG. 1 is a schematic configuration diagram related to a thin-layer tape automated lamination device according to the present invention.

FIG. 1 is a schematic configuration diagram related to a thin-layer tape automated lamination device according to an embodiment of the present invention. In the present embodiment, a provisional formation unit configured to form a plurality of thin-layer tapes into a temporarily bonded state through lamination in advance is provided as a supply unit configured to supply a plurality of thin-layer tapes.

An automated lamination device 1 includes a provisional formation unit 2 configured to form lamination tapes having thicknesses different from each other by laminating thin-layer tapes, and a lamination-shaping unit 3 configured to laminate and shape the lamination tapes in a lamination region of a basal body surface and integration. Each thin-layer tape is made of a material such as a thin-layer prepreg tape or a resin tape as described later and thinly formed to have a thickness of 5 μm to 80 μm. In the following description, the conveyance direction of the thin-layer tapes or the lamination tapes is simply referred to as a "conveyance direction". The lamination region of the basal body surface is a region of direct lamination on the basal body surface and a region of lamination on the surface of a tape laminated on the basal body surface.

The provisional formation unit 2 includes feeding units 210, 220, and 230 in which rolls R1 to R3 obtained by winding thin-layer tapes T1 to T3, respectively, each made of a thin-layer prepreg tape are set to a plurality of bobbins attached to a support frame body (not illustrated) such as a creel stand. With this configuration, the thin-layer tapes T1 to T3 are unreeled from the respective feeding units and overlapped.

In the feeding unit 210, the thin-layer tape T1 is unreeled and conveyed to a bonding unit 211 while a release sheet bonded to one surface thereof is peeled and winded around a winding roll L1. The bonding unit 211 includes a heat roller 211a and a press roller 211b between which the thin-layer tape T1 passes while being pressed in contact.

In the feeding unit 220, the thin-layer tape T2 is unreeled and conveyed to a bonding unit 221 while a release sheet bonded to one surface thereof is peeled and wound around a winding roll L2. The bonding unit 221 includes a heat roller 221a and a press roller 221b between which the thin-layer tape T2 passes while being pressed in contact and is then conveyed to a cutting unit 222. The cutting unit 222 includes a cutter 222a and a pair of nip rollers 222b and 222c disposed on both sides of the cutter 222a. The thin-layer tape T2 is sandwiched between the nip rollers 222b and 222c and rotates both nip rollers while being unreeled. The thin-layer tape T2 inserted into the cutting unit 222 is cut by the cutter 222a while being sandwiched between the pair of nip rollers 222b and 222c at a predetermined cutting position. The thin-layer tape T2 having passed through the cutting unit 222 is inserted into the bonding unit 211 and passes between the heat roller 211a and the press roller 211b while being overlapped with the thin-layer tape T1 and bonded.

Figure 2A:
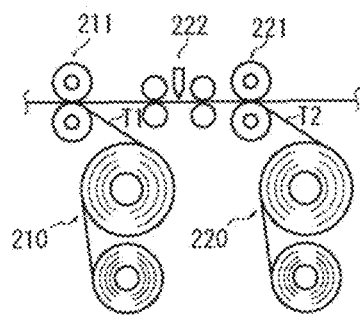
FIG. 2A is an explanatory diagram related to a thin-layer tape feeding operation at a feeding unit.
Figure 2B:
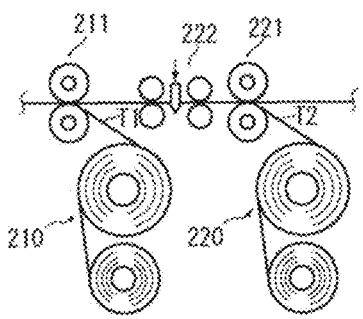
FIG. 2B is an explanatory diagram related to the thin-layer tape feeding operation at the feeding unit.
Figure 2C:
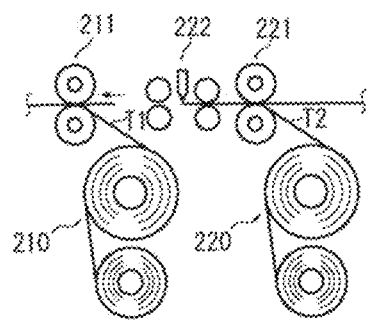
FIG. 2C is an explanatory diagram related to the thin-layer tape feeding operation at the feeding unit.
Figure 2D:
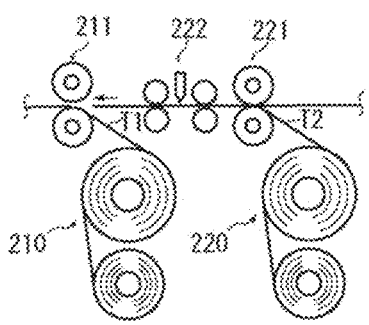
FIG. 2D is an explanatory diagram related to the thin-layer tape feeding operation at the feeding unit.

FIGS. 2A to 2D are each an explanatory diagram related to a feeding operation of the thin-layer tape T2 in the feeding unit 220. In FIG. 2A, the thin-layer tape T2 passes through the bonding unit 221 and the cutting unit 222 and is conveyed into the bonding unit 211 and overlapped and bonded with the thin-layer tape T1. In FIG. 2B, the cutter of the cutting unit 222 is operated to cut the thin-layer tape T2 at a predetermined cutting position. In FIG. 2C, part of the cut thin-layer tape T2 on the bonding unit 211 side is conveyed intact and bonded with the thin-layer tape T1. In FIG. 2D, the nip rollers of the cutting unit 222 are rotated to unreel the thin-layer tape T2 and then stops and waits when the leading end thereof has reached the near side of the bonding unit 211. In this manner, it is possible to provisionally form a lamination tape, the thickness of which is changed by bonding a thin-layer tape as a base with another thin-layer tape having an optional length.

In the feeding unit 230, the thin-layer tape T3 is unreeled and conveyed to a bonding unit 231 while a release sheet bonded to one surface thereof is peeled and winded around a winding roll L3. The bonding unit 221 includes a heat roller 231a and a press roller 231b between which the thin-layer tape T2 passes and then is conveyed to a cutting unit 222. In the bonding unit 231, no other thin-layer tape is conveyed from the downstream side in the conveyance direction, and thus the heat roller 231a and the press roller 231b are separated from each other not to perform bond processing. The cutting unit 232 includes a cutter 232a and a pair of nip rollers 232b and 232c disposed on both sides of the cutter 232a. The thin-layer tape T3 is sandwiched between the nip rollers 232b and 232c and rotates both nip rollers while being unreeled. The thin-layer tape T3 inserted into the cutting unit 232 is sandwiched between the pair of nip rollers 232b and 232c at a predetermined cutting position and cut by the cutter 232a. The thin-layer tape T3 having passed through the cutting unit 232 is inserted into the bonding unit 221, passes between the heat roller 221a and the press roller 221b while being overlapped with the thin-layer tape T2 and bonded, and then is conveyed to the bonding unit 211.

When a thin-layer prepreg tape is used as each thin-layer tape, resin of the thin-layer prepreg tape is softened to have increased tackiness by heating of the heat rollers 211a, 221a, and 231a in the bonding units 211, 221, and 231, and thus the thin-layer prepreg tapes become likely to be bonded to each other. However, when each thin-layer prepreg tape has a sufficient tackiness, the heat rollers may be used as press rollers without heating so that the thin-layer prepreg tapes are bonded to each other through pressurization by the rollers.

Figure 3:
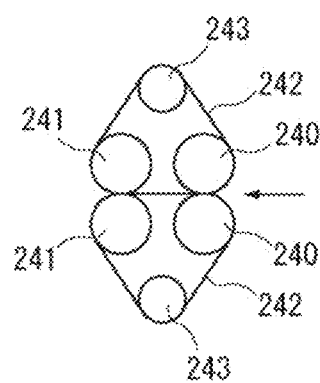
FIG. 3 is a schematic configuration diagram illustrating an exemplary configuration of a bonding unit when a matrix resin of a thin-layer prepreg tape is a thermoplastic resin material.

FIG. 3 is a schematic configuration diagram illustrating an exemplary configuration of a bonding unit when matrix resin of each thin-layer prepreg tape is a thermoplastic resin material. In FIG. 3, a pair of heating rollers 240 and a pair of cooling rollers 241 are provided for the thin-layer prepreg tapes inserted in the direction of arrow. A pair of heat-resistant belts 242 are extended around the heating rollers 240 and the cooling rollers 241 through conveyance rollers 243. When introduced between the heat-resistant belts 242, the thin-layer prepreg tapes are heated by the heating rollers 240 and the thermoplastic resin material contained in each thin-layer prepreg tape is melted so that the thin-layer prepreg tapes are bonded to each other, and thereafter, the thin-layer prepreg tapes are cooled by the cooling rollers 241 and bonded and fixed to each other through solidification of the thermoplastic resin material. Each cooling roller 241 may be cooled by a well-known cooling device in which, for example, a cooling material such as cooling water circulates.

The thin-layer tape T3 is cut at a predetermined length by the cutting unit 232 while being fed and is laminated on the thin-layer tape T2 at the bonding unit 221, and the thin-layer tape T2 is cut at a predetermined length by the cutting unit 222 while being fed and is laminated on the thin-layer tape T1 at the bonding unit 211. This obtains three kinds of provisionally formed tapes having thicknesses different from each other, namely, a lamination tape obtained by laminating the three thin-layer tapes T1 to T3, a lamination tape obtained by laminating the two thin-layer tapes T1 and T2, and a tape of only one thin-layer tape. In each lamination tape, the thin-layer tapes are bonded to each other but not integrated with each other in a shaped body.

Figure 4:
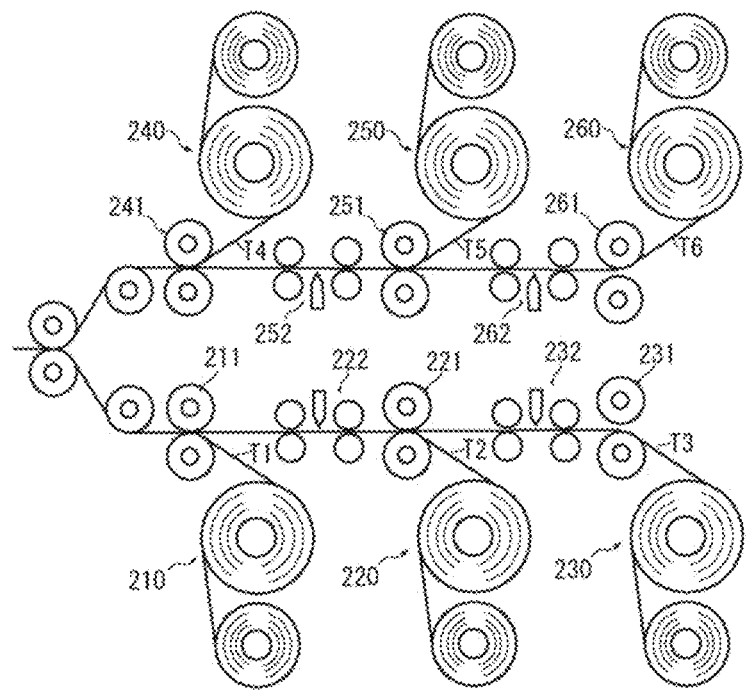
FIG. 4 is a schematic configuration diagram related to a modification of a provisional formation unit illustrated in FIG. 1.

In this example, the provisional formation unit 2 laminates three thin-layer tapes, but the number of thin-layer tapes to be laminated can be increased by adding a set of a feeding unit, a bonding unit, and a cutting unit, and it is possible to obtain a lamination tape in which a desired number of thin-layer tapes are laminated as necessary. FIG. 4 is a schematic configuration diagram related to a modification of the provisional formation unit 2 illustrated in FIG. 1. In this example, six sets of a feeding unit, a bonding unit, and a cutting unit are disposed in parallel with three sets on each side to provisionally form six kinds of lamination tapes in which six thin-layer tapes T1 to T6 are laminated at maximum and that have thicknesses different from each other.

A lamination tape S formed by the provisional formation unit 2 is conveyed to the lamination-shaping unit 3 by a conveyance roller 40 of a conveyance unit 4. The lamination-shaping unit 3 includes a shaping head unit 30 configured to laminate and integrate the lamination tape S in the lamination region of the basal body surface, a multi-joint arm unit 31 configured to move the shaping head unit 30, and a drive unit 32 configured to control drive of the multi-joint arm unit 31. A lamination-shaping operation is performed by driving the multi-joint arm unit 31 through the drive unit 32 to move the shaping head unit 30 relative to the basal body surface.

The shaping head unit 30 includes a shape roller 30a configured to bond and integrate the lamination tape S conveyed from the conveyance unit 4 to the lamination region of the basal body surface through heating pressurization in close contact, a guiding unit 30b disposed upstream of the shape roller 30a in the conveyance direction to guide the lamination tape S, a cutter 30c configured to cut the lamination tape S being grasped by a grasping unit 30b, and nip rollers 30d disposed upstream of the cutter 30c in the conveyance direction. A gap through which the lamination tape S can pass is formed inside the guiding unit 30b so that the surface of the tape is set along a lamination surface of the lamination region as the lamination tape S passes through the gap.

The lamination tape S is conveyed from the conveyance unit 4 into the nip rollers 30d, and rotates the nip rollers 30d and is conveyed while being sandwiched between the nip rollers 30d. The conveyed lamination tape S passes through the guiding unit 30b and is guided toward the shape roller 30a and introduced between the lamination region of the basal body surface and the shape roller 30a. The lamination tape S is bonded and fixed to the lamination region by pressing as the shaping head unit 30 is moved in accordance with the introduction speed of the lamination tape S. When lamination of the lamination tape S is to be performed by a predetermined length in accordance with a shape to be formed, the lamination tape S is cut by the cutter 30c after the nip rollers 30d perform a conveyance operation by the predetermined length, thereby accurately achieving lamination-shaping of the lamination tape S having the predetermined length.

Figure 5:
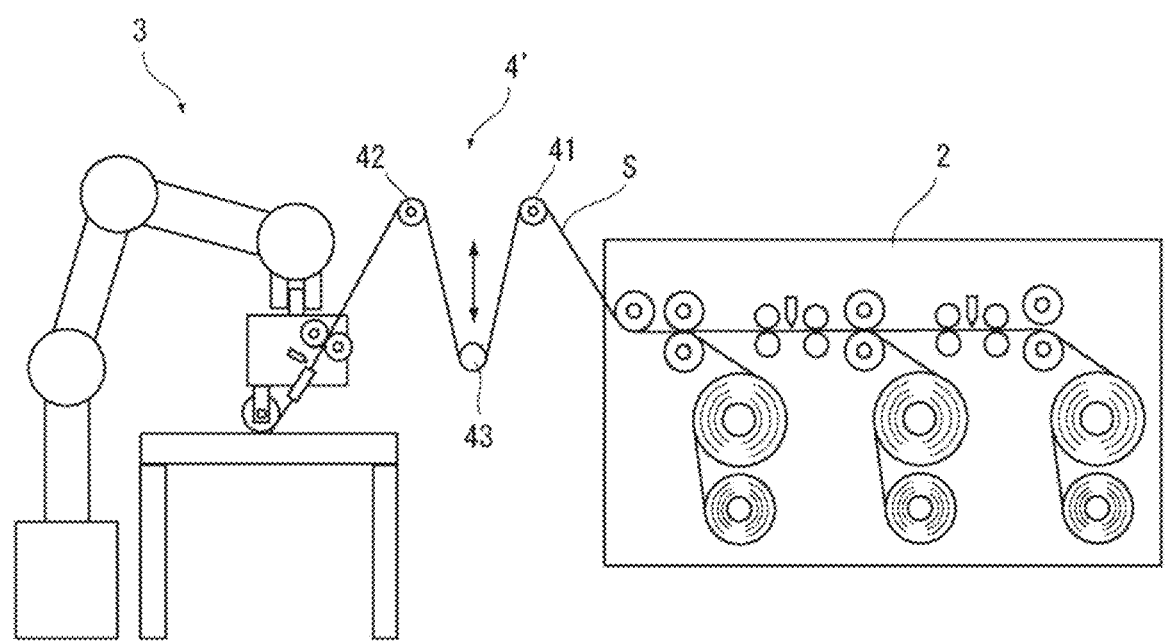
FIG. 5 is a schematic configuration diagram illustrating a modification related to a conveyance unit of the exemplary device illustrated in FIG. 1.

FIG. 5 is a schematic configuration diagram illustrating a modification related to the conveyance unit of the exemplary device illustrated in FIG. 1. In this example, a conveyance unit 4' includes an adjustment roller 43 disposed between a pair of conveyance rollers 41 and 42, and the adjustment roller 43 moves close to or away from the conveyance rollers 41 and 42 to adjust the length of the conveyance path of the lamination tape S between the conveyance rollers 41 and 42.

When the amount of introduction of the lamination tape S through a lamination operation of the lamination-shaping unit 3 is different from the amount of feeing-out of the lamination tape S formed by the provisional formation unit 2, the adjustment roller 43 is moved to perform length adjustment of the lamination tape S, thereby conveying the lamination tape S formed by the provisional formation unit 2 to the lamination-shaping unit 3 through conveyance adjustment in accordance with the lamination operation of the lamination-shaping unit 3. For example, when the amount of introduction of the lamination-shaping unit 3 is smaller than the amount of feeing-out of the provisional formation unit 2, the adjustment roller 43 is moved in accordance with the difference amount between the amount of introduction and the amount of feeing-out to perform adjustment so that the conveyance path becomes longer, and accordingly, the lamination tape S can be conveyed without deflection. When the amount of introduction is larger than the amount of feeing-out, the adjustment roller 43 is moved in accordance with the difference amount to perform adjustment so that the conveyance path becomes shorter, and accordingly, the lamination tape S can be conveyed without excessive tension.

Figure 6A:
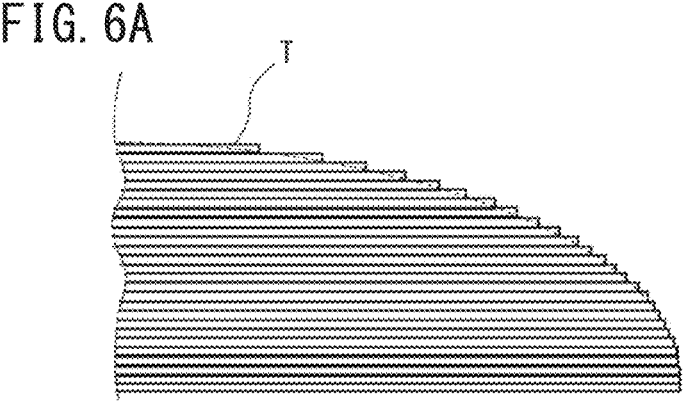
FIG. 6A is a cross-sectional view illustrating a surface state in a case of lamination-shaping into a curved surface shape.
Figure 6B:
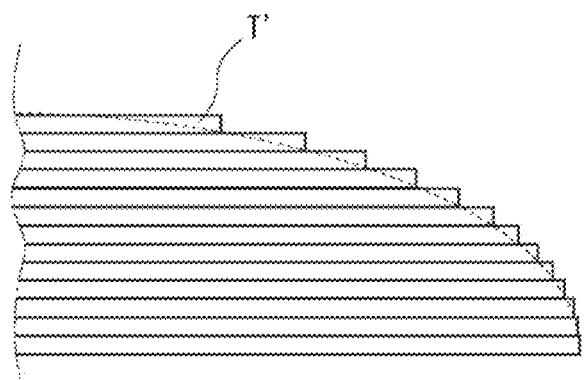
FIG. 6B is a cross-sectional view illustrating a surface state in a case of lamination-shaping into a curved surface shape.

As described above, since the lamination tape S can be formed by cutting a thin-layer tape at an optional length and laminating the cut thin-layer tape on another thin-layer tape as a base, the lamination tape S can be provisionally formed through fine lamination in accordance with a shape to be formed. For example, FIGS. 6A and 6B are each a cross-sectional view illustrating a surface state in a case of lamination-shaping into a curved surface shape. As illustrated in FIG. 6A, lamination-shaping can be finely performed by offsetting and laminating thin-layer prepreg tapes T in accordance with a curved surface shape illustrated with a dotted line. In this case, the thin-layer tapes can be laminated into a shape close to the curved surface shape by cutting and laminating the thin-layer tapes so that the leading ends of the thin-layer tapes are offset at provisional formation into a lamination tape. As illustrated in FIG. 6B, when tapes T' each having a normal thickness are laminated, the tapes are laminated into a shape with undulation from the curved surface shape due to the thicknesses of the tapes even with offsetting and laminating in accordance with a curved surface shape illustrated with a dotted line, which is not preferable.

In a lamination tape in which a plurality of thin-layer prepreg tapes are laminated as thin-layer tapes, the thin-layer prepreg tapes are laminated with reinforcement fiber materials being aligned in each thin-layer prepreg tape, and thus the disorder of the reinforcement fiber materials in the thickness direction is small and straightness of the reinforcement fiber materials is improved as compared to a conventional prepreg tape having the same thickness. Thus, the lamination tape is excellent in mechanical characteristics such as tensile and compression characteristics as compared to the conventional prepreg tape having the same thickness. When laminated on the basal body surface or the like, the lamination tape has a thickness substantially equal to that of the conventional prepreg tape, and as a result, a high-quality laminated body can be shaped at operation efficiency same as that for the conventional prepreg tape.

In addition, a thin-layer prepreg tape and a lamination tape have excellent drape characteristics, can be deformed along the shape of the lamination region of the basal body surface, and can flexibly deal with deformation such as bend and torsion occurred in conveyance and return to the original shape, and thus, a high-quality laminated body can be shaped with the tapes. This increases the degree of freedom of arraying sets of a feeding unit, a bonding unit, and a cutting unit in the provisional formation unit, and thus a plurality of sets can be efficiently disposed in a small space to reduce the size of the device.

In addition, as described above, lamination tapes having thicknesses different from each other can be formed by changing the number of laminated thin-layer tapes, and a laminated body having a more accurate shape can be obtained by changing the thickness of a lamination tape in accordance with a shape into which lamination is performed.

Thin-layer prepreg tapes and resin tapes may be used as thin-layer tapes and are preferably each set to have a thickness of 5 µm to 80 µm. When the thin-layer tape thickness is smaller than 5 µm, it is difficult to achieve uniformity of the thickness, and as a result, unevenness of the thickness is likely to occur, and break is likely to occur when tension is applied. When the thin-layer tape thickness is larger than 80 µm, in-layer matrix crack and interlayer peeling are likely to occur in pseudo isotropic lamination.

The thickness of a thin-layer prepreg tape in a resin impregnation state is preferably set to be 20 µm to 80 µm. As for the tensile characteristic, a shaped body formed through lamination can reduce occurrence of delamination (interlayer peeling) when the thickness of a thin-layer prepreg tape is 80 µm or smaller. As for the bending and compression characteristics, the difference in maximum strength and initial elasticity among test pieces cut out in various kinds of directions is reduced, and pseudo isotropy is improved. In addition, improved fatigue lifetime can be obtained.

The thickness of a thin-layer prepreg tape in the resin impregnation state is preferably as small as possible, more preferably 40 µm or smaller. However, it is difficult to manufacture a thin-layer prepreg tape having a thickness of 20 µm or smaller. For example, the diameter of a general-purpose carbon fiber is 7 µm approximately, and three carbon fibers or less need to be distributed in the thickness direction when a thin-layer prepreg tape having a thickness of 20 µm or smaller is to be produced by using a carbon fiber as a reinforcement fiber material, and thus it is difficult to manufacture such a thin-layer prepreg tape. In addition, a resin material as a matrix needs to be formed in a sheet shape of 10 µm or smaller, and it is difficult to manufacture tapes and continuously obtain stable prepreg tapes. Thus, a thin-layer prepreg tape is desirably produced in a thickness of 20 µm or larger to maintain constant quality.

A reinforcement fiber material used for a thin-layer prepreg tape is formed by a plurality of reinforcement fibers. Examples of reinforcement fibers include high-strength and high-elasticity inorganic and organic fibers used as fiber reinforcement composite materials, such as a carbon fiber, a glass fiber, a ceramic fiber, a polyoxymethylene fiber, and an aromatic polyamide fiber, and a plurality of these fibers may be combined, but fineness is not particularly limited. The reinforcement fiber material may be thinly and equally distributed and aligned by a well-known air opening method (refer to Japanese Patent No. 4740131, for example).

Examples of a resin material as a matrix of a thin-layer prepreg tape include thermosetting resin materials such as epoxy resin, unsaturated polyester resin, vinyl ester resin, and phenol resin, or thermoplastic resin materials such as polypropylene resin, polyamide resin, polyphenylene sulfide resin, polyetherimide resin, polyether ether ketone resin, and polymer alloy resin as a mixture of two kinds or more of these thermoplastic resins. In particular, epoxy resin as thermosetting resin is preferably used and is typically used in combination with a curing agent or a curing catalyst.

A thin-layer prepreg tape may be manufactured by a well-known prepreg manufacturing device configured to impregnate a thermosetting resin material or a thermoplastic resin material in a reinforcement fiber material. When a thermoplastic resin material is used, a tape member obtained by bonding a reinforcement fiber material to a film of the thermoplastic resin material by thermal fusion or the like can be manufactured as a thin-layer prepreg tape.

The thickness of a resin tape is preferably set to be 5 µm to 20 µm. When the thickness of a resin tape is smaller than 5 µm, it is difficult to achieve uniformity of the thickness, and as a result, unevenness of the thickness is likely to occur, and break is likely to occur when tension is applied. When the resin tape thickness is larger than 20 µm, the fiber volume content (Vf) is reduced in lamination with a thin-layer prepreg tape, which degrades mechanical characteristics of an obtained laminated body. Examples of a resin material used for a resin tape include the above-described resin materials used for the matrix of a thin-layer prepreg tape. Examples of the resin tape material include materials such as non-woven fabric and film as well as a material obtained by impregnating a resin material in non-woven fabric.

A lamination tape may be formed by laminating a plurality of thin-layer prepreg tapes or laminating a thin-layer prepreg tape and a resin tape, which allows shaping of laminated bodies having various structures.

Figure 7:
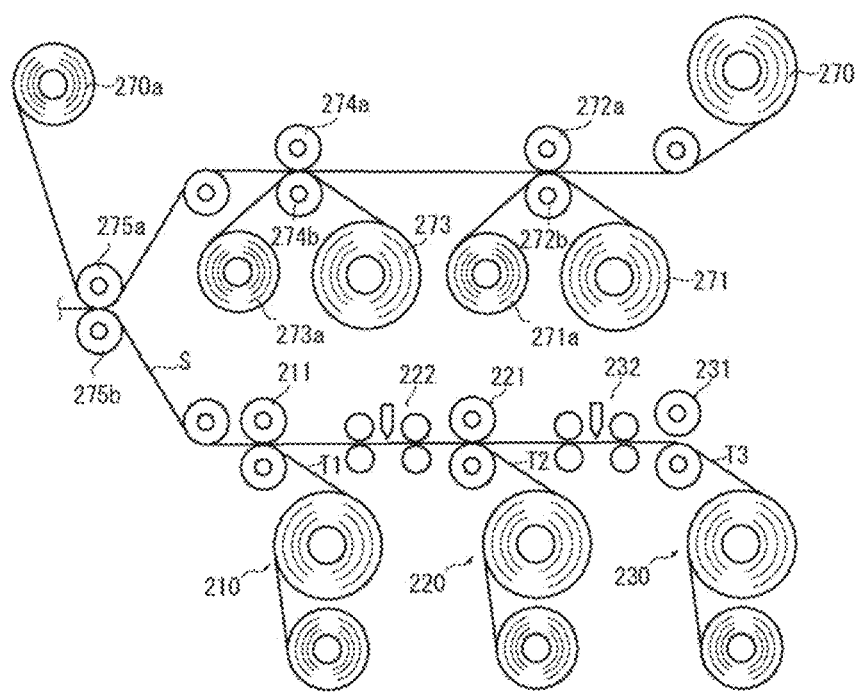
FIG. 7 is a schematic configuration diagram related to another modification of the provisional formation unit illustrated in FIG. 1.

FIG. 7 is a schematic configuration diagram related to another exemplary of the supply unit illustrated in FIG. 1. In this example, similarly to the example illustrated in FIG. 1, a lamination tape formation unit corresponding to a provisional formation unit configured to form a lamination tape by laminating thin-layer prepreg tapes T1 to T3 is provided, and a resin tape formation unit configured to form a resin tape is disposed in parallel to the lamination tape formation unit. The resin tape formation unit includes a conveyance sheet 270 for the resin tape, holding tapes 271 and 273 for a resin material, and heat rollers 272a and 274a configured to transfer the resin material from the holding tapes 271 and 273 to the conveyance sheet 270 to form the resin tape. Press rollers 272b and 274b are disposed opposite to the heat rollers 272a and 274a, respectively.

The conveyance sheet 270 and the holding tape 271 are unreeled, conveyed, and introduced between the heat roller 272a and the press roller 272b so that the conveyance sheet 270 and the holding tape 271 are overlapped with each other, and accordingly, both members are bonded to each other by pressing, and the conveyance sheet 270 side is heated by the heat roller 272a so that the resin material of the holding tape 271 is transferred to the conveyance sheet 270 side. The conveyance sheet 270 on which the resin material is transferred and a resin tape having an increased thickness is formed is introduced between the heat roller 274a and the press roller 274b so that the conveyance sheet 270 is overlapped with the holding tape 273, and accordingly, both members are bonded to each other by pressing and heated by the heat roller 274a on the conveyance sheet 270 side so that the resin material of the holding tape 273 is transferred to the conveyance sheet 270 side and laminated on the resin tape. Then, the conveyance sheet 270 on which the resin tape is laminated and formed is introduced between a heat roller 275a and a press roller 275b together with the lamination tape S formed through lamination by the lamination tape formation unit, and accordingly, both members are bonded to each other by pressing so that the resin tape formed on the conveyance sheet 270 is transferred to the lamination tape S side by heating of the heat roller 275*a* on the lamination tape S side and laminated. The lamination tape S on which the resin tape and the thin-layer prepreg tape are laminated is conveyed to the lamination-shaping unit 3 and laminated and integrated in the lamination region of the basal body surface, thereby shaping a laminated body including a resin layer. With this method, it is possible to form a resin tape in accordance with the thickness of a lamination tape on which a thin-layer prepreg tape is laminated. It is possible to stably shape a lamination-shaped body having a predetermined fiber volume content through lamination-shaping by using a lamination tape on which a resin tape and a thin-layer prepreg tape are laminated.

Figure 8:
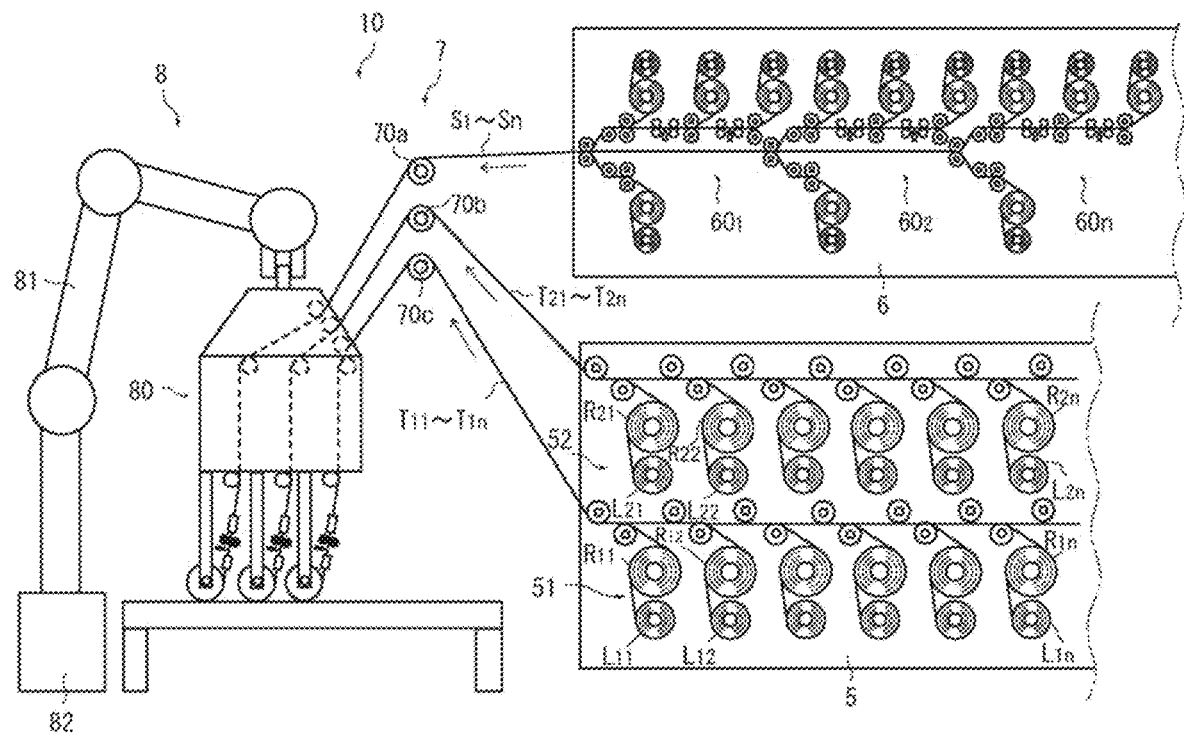
FIG. 8 is a schematic configuration diagram related to another embodiment of the thin-layer tape automated lamination device according to the present invention.

FIG. 8 is a schematic configuration diagram related to another embodiment of the thin-layer tape automated lamination device according to the present invention. In the present embodiment, a supply unit configured to supply a plurality of thin-layer tapes supplies provisionally formed lamination tapes as some of the thin-layer tapes and supplies thin-layer prepreg tapes as the other thin-layer tapes, and the supplied lamination tapes and thin-layer tapes are automatically laminated.

An automated lamination device 10 includes a feeding unit 5 configured to feed a plurality of thin-layer prepreg tapes, a provisional formation unit 6 configured to form a plurality of lamination tapes, a conveyance unit 7 configured to convey the plurality of fed thin-layer prepreg tapes and lamination tapes, and a lamination-shaping unit 8 configured to bond the plurality of conveyed thin-layer prepreg tapes and lamination tapes in the lamination region of the basal body surface.

The lamination-shaping unit 8 sequentially laminates the thin-layer prepreg tapes supplied from the feeding unit 5 and the lamination tapes formed by the provisional formation unit 6 in the lamination region of the basal body surface in an overlapping manner in a lamination operation direction, and integrates and shapes the laminated thin-layer prepreg tapes and lamination tapes. In this example, at a shaping head unit 80 of the lamination-shaping unit 8, the lamination tapes and thin-layer prepreg tapes are introduced to tape lamination units 80*a* to 80*c* provided side by side in the lamination operation direction and laminated from the tape lamination units 80*a* to 80*c* onto the lamination region of the basal body surface in a sequentially overlapping manner.

The feeding unit 5 includes a feeding unit 51 in which rolls $R_{11}$ to $R_{1n}$ obtained by winding thin-layer prepreg tapes $T_{11}$ to $T_{1n}$, respectively, are set to a plurality of bobbins attached to a support frame body (not illustrated) such as a creel stand, and a feeding unit 52 in which rolls $R_{21}$ to $R_{2n}$ obtained by winding thin-layer prepreg tapes $T_{21}$ to $T_{2n}$, respectively, are set to a plurality of bobbins. The thin-layer prepreg tapes $T_{11}$ to $T_{1n}$ are unreeled from the rolls $R_{11}$ to $R_{1n}$ and fed from the feeding unit 51 while release sheets bonded to surfaces thereof on one side are peeled and wound around winding rolls $L_{11}$ to $L_{1n}$. The thin-layer prepreg tapes $T_{21}$ to $T_{2n}$ are unreeled from the rolls $R_{21}$ to $R_{2n}$ and fed from the feeding unit 52 while release sheets bonded to surfaces thereof on one side are peeled and wound around winding rolls $L_{21}$ to $L_{2n}$.

The thin-layer prepreg tapes $T_{11}$ to $T_{1n}$ and $T_{21}$ to $T_{2n}$ fed from the feeding unit 5 are conveyed to the lamination-shaping unit 8 by the conveyance unit 7. Conveyance rollers 70*b* and 70*c* of the conveyance unit 7 convey the thin-layer prepreg tapes $T_{11}$ to $T_{1n}$ and $T_{21}$ to $T_{2n}$ to tape lamination units 80*b* and 80*c*, respectively, in parallel.

The provisional formation unit 6 includes provisional formation units $60_1$ to $60_n$ configured to form lamination tapes $S_1$ to $S_n$, respectively, obtained by laminating a plurality of thin-layer prepreg tapes. Similarly to the provisional formation unit 2 illustrated in FIG. 1, each provisional formation unit includes a plurality of feeding units in which a plurality of rolls obtained by winding thin-layer prepreg tapes are set to a plurality of bobbins attached to a support frame body (not illustrated) such as a creel stand, and the thin-layer prepreg tapes are unreeled from the respective feeding units and fed to be overlapped with each other. Then, as described with reference to FIG. 1, the thin-layer prepreg tapes fed from the respective feeding units are each cut at a predetermined length by a cutting unit while being fed with a release sheet bonded to one surface thereof being peeled, and are bonded to each other by a bonding unit while being overlapped with each other, thereby forming a lamination tape.

The lamination tapes $S_1$ to $S_n$ fed from the provisional formation unit 6 are conveyed to the lamination-shaping unit 8 by the conveyance unit 7. A conveyance roller 70*a* of the conveyance unit 7 conveys the lamination tapes $S_1$ to $S_n$ to a tape lamination unit 80*a* in parallel to the thin-layer prepreg tapes $T_{11}$ to $T_{1n}$ and $T_{21}$ to $T_{2n}$.

The lamination-shaping unit 8 includes the shaping head unit 80 configured to laminate and integrate the lamination tape S in the lamination region of the basal body surface, a multi-joint arm unit 81 configured to move the shaping head unit 80, and a drive unit 82 configured to control drive of the multi-joint arm unit 81. The lamination-shaping operation is performed as the multi-joint arm unit 81 is driven by the drive unit 82 to move the shaping head unit 80 relative to the basal body surface.

The shaping head unit 80 includes the plurality of tape lamination units 80*a* to 80*c* arrayed in the lamination operation direction below a support body.

The tape lamination units 80*a* to 80*c* are disposed at a predetermined interval in the lamination operation direction, and the shaping head unit 80 laminates lamination tapes and thin-layer prepreg tapes at a plurality of lamination positions arrayed in the lamination operation direction. The lamination tapes $S_1$ to $S_n$ and the thin-layer prepreg tapes $T_{11}$ to $T_{1n}$ and $T_{21}$ to $T_{2n}$ conveyed from the conveyance unit 7 are sequentially laminated in the lamination region of the basal body surface and bonded and integrated by pressurization or heating pressurization. Thus, a plurality of lamination tapes and thin-layer prepreg tapes can be simultaneously laminated at a plurality of lamination positions through one lamination operation, which improves the operation efficiency.

In addition, the number of lamination tapes and thin-layer prepreg tapes to be laminated can be changed by selecting tape lamination units as appropriate, and thus the thickness of lamination-shaping can be finely set.

Figure 9A:
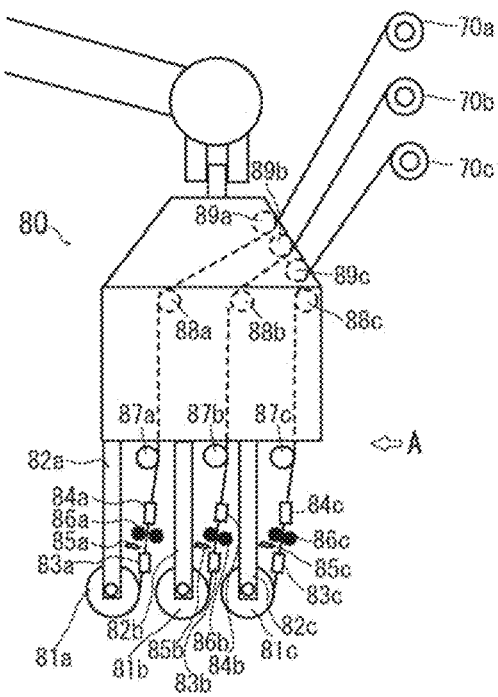
FIG. 9A is a partially enlarged diagram of a shaping head unit when viewed in a direction orthogonal to a lamination operation direction.
Figure 9B:
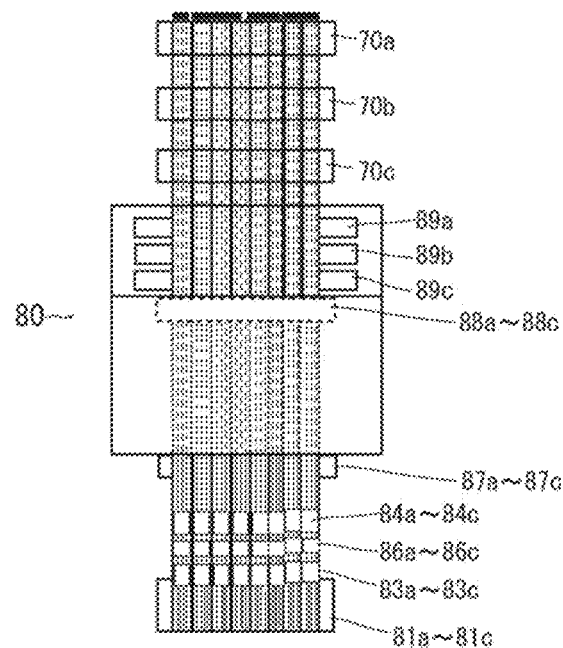
FIG. 9B is a partially enlarged diagram when viewed in the direction of arrow A illustrated in FIG. 9A.

FIGS. 9A and 9B each illustrate a partially enlarged diagram related to the shaping head unit 80: FIG. 9A is a diagram when viewed in a direction orthogonal to the lamination operation direction; and FIG. 9B is a diagram when viewed in the direction of arrow A illustrated in FIG. 9A. The tape lamination units 80*a* to 80*c* include tape lamination rollers 81*a* to 81*c* configured to bond and integrate the lamination tapes $S_1$ to $S_n$ and the thin-layer prepreg tapes $T_{11}$ to $T_{1n}$ and $T_{21}$ to $T_{2n}$ by pressurization or heating pressurization, and support members 82*a* to 82*c* supporting the tape lamination rollers 81*a* to 81*c*, respectively. Pairs of guiding units 83*a* to 83*c* and 84*a* to 84*c* configured to guide the lamination tapes $S_1$ to $S_n$ and the thin-layer prepreg tapes $T_{11}$ to $T_{1n}$ and $T_{21}$ to $T_{2n}$, respectively, cutters 85a to 85c configured to cut the lamination tapes $S_1$ to $S_n$ and the thin-layer prepreg tapes disposed between the guiding units 83a to 83c and 84a to 84c, and nip rollers 86a to 86c disposed upstream of the cutters 85a to 85c in the conveyance direction are provided upstream of the tape lamination rollers 81a to 81c in the conveyance direction. Gaps through which the lamination tapes $S_1$ to $S_n$ and the thin-layer prepreg tapes $T_{11}$ to $T_{1n}$ and $T_{21}$ to $T_{2n}$ can pass are formed inside the guiding units 83a to 83c and 84a to 84c, respectively, and the tape surfaces can be set along the lamination surface of the lamination region as the lamination tapes $S_1$ to $S_n$ and the thin-layer prepreg tapes $T_{11}$ to $T_{1n}$ and $T_{21}$ to $T_{2n}$ pass through the gaps.

The lamination tapes $S_1$ to $S_n$ and the thin-layer prepreg tapes $T_{11}$ to $T_{1n}$ and $T_{21}$ to $T_{2n}$ conveyed from the conveyance unit 7 into the shaping head unit 80 are guided to the tape lamination units 80a to 80c by guide rollers 87a to 87c, 88a to 88c, and 89a to 89c provided inside the support body of the shaping head unit 80, and are introduced to the nip rollers 86a to 86c, respectively. Then, the nip rollers 86a to 86c rotate while sandwiching the lamination tapes $S_1$ to $S_n$ and the thin-layer prepreg tapes $T_{11}$ to $T_{1n}$ and $T_{21}$ to $T_{2n}$, thereby conveying the respective tapes. The lamination tapes $S_1$ to $S_n$ and the thin-layer prepreg tapes $T_{11}$ to $T_{1n}$ and $T_{21}$ to $T_{2n}$ thus conveyed pass through the guiding units 83a to 83c and 84a to 84c and are guided toward the tape lamination rollers 81a to 81c and each introduced between the lamination region of the basal body surface and the corresponding one of the tape lamination rollers 81a to 81c. The tape lamination units 80a to 80c are moved in accordance with the speed of introduction of the lamination tapes $S_1$ to $S_n$ and the thin-layer prepreg tapes $T_{11}$ to $T_{1n}$ and $T_{21}$ to $T_{2n}$ to bond and fix the lamination tapes $S_1$ to $S_n$ and the thin-layer prepreg tapes $T_{11}$ to $T_{1n}$ and $T_{21}$ to $T_{2n}$ to the lamination region by pressing. When the lamination tapes $S_1$ to $S_n$ and the thin-layer prepreg tapes $T_{11}$ to $T_{1n}$ and $T_{21}$ to $T_{2n}$ are to be laminated by predetermined lengths in accordance with a shape to be formed, the lamination tapes $S_1$ to $S_n$ and the thin-layer prepreg tapes $T_{11}$ to $T_{1n}$ and $T_{21}$ to $T_{2n}$ are cut by the cutters 85a to 85c while the nip rollers 86a to 86c perform the conveyance operation by the predetermined lengths, thereby accurately laminating the lamination tapes $S_1$ to $S_n$ and the thin-layer prepreg tapes $T_{11}$ to $T_{1n}$ and $T_{21}$ to $T_{2n}$ having the predetermined lengths in accordance with the formed shape.

In this example, as illustrated in FIG. 9B, the plurality of lamination tapes $S_1$ to $S_n$ are arrayed in the width direction and conveyed in from the feeding unit 7, and the tape lamination roller 81a is provided for the lamination tapes $S_1$ to $S_n$ arrayed in the width direction. Thus, the tape lamination roller 81a can laminate the lamination tapes $S_1$ to $S_n$ all at once by pressurized-heating. The guiding units 83a and 84a, the cutter unit 85a, and nip rollers 86a are individually provided for each of the lamination tapes $S_1$ to $S_n$, and each lamination tape can be cut and shaped through lamination.

Similarly to the lamination tapes $S_1$ to $S_n$, the thin-layer prepreg tapes $T_{11}$ to $T_{1n}$ and $T_{21}$ to $T_{2n}$ are arrayed in the width direction and conveyed in from the feeding unit 7. Then, a tape lamination roller 81c is provided for the plurality of thin-layer prepreg tapes $T_{11}$ to $T_{1n}$, and a tape lamination roller 81b is provided for the plurality of thin-layer prepreg tapes $T_{21}$ to $T_{2n}$. Thus, the thin-layer prepreg tapes $T_{11}$ to $T_{1n}$ and $T_{21}$ to $T_{2n}$ are laminated through pressurized-heating all at once by the tape lamination rollers 81b and 81c, respectively. Guiding units 83b and 84b, the cutter unit 85b, and nip rollers 86b are individually provided for each of the thin-layer prepreg tapes $T_{21}$ to $T_{2n}$, guiding units 83c and 84c, the cutter unit 85c, and nip rollers 86c are individually provided for each of the thin-layer prepreg tapes $T_{11}$ to $T_{1n}$, and with this configuration, it is possible to cut each thin-layer prepreg tape and perform lamination-shaping.

Thus, it is possible to perform fine lamination-shaping corresponding to a formed shape by individually cutting the lamination tapes $S_1$ to $S_n$ and the thin-layer prepreg tapes $T_{11}$ to $T_{1n}$ and $T_{21}$ to $T_{2n}$ and bonding and fixing the cut tapes all at once in accordance with the formed shape, and it is possible to perform a stable lamination operation.

Figure 10:
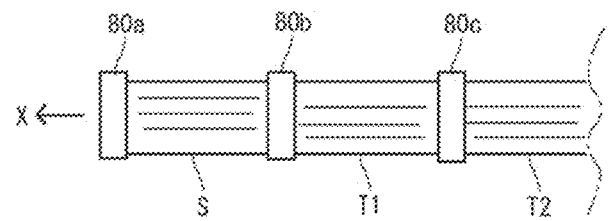
FIG. 10 is an explanatory diagram related to a lamination operation of a tape lamination unit.

FIG. 10 is an explanatory diagram related to a lamination operation of the tape lamination units 80a to 80c. Lamination positions are set so that the tape lamination units 80a to 80c are arrayed in the lamination operation direction X, and first, the lamination tapes $S_1$ to $S_n$ are bonded and fixed by the tape lamination unit 80a while being arrayed in the width direction, and as a result, a lamination part S is formed. Subsequently, the thin-layer prepreg tapes $T_{21}$ to $T_{2n}$ are bonded and fixed above the lamination part S by the tape lamination unit 80b while being arrayed in the width direction, and as a result, a lamination part 12 is formed by lamination. Lastly, the thin-layer prepreg tapes $T_{11}$ to $T_{1n}$ are bonded and fixed above the lamination part 12 by the tape lamination unit 80c while being arrayed in the width direction, and as a result, a lamination part $T_1$ is formed by lamination, and accordingly, the three lamination parts are shaped by lamination in an overlapping manner.

In this manner, a plurality of tapes can be simultaneously laminated through one lamination operation of the shaping head unit 80 by a plurality of tape lamination units, and thus the operation efficiency can be significantly improved as compared to a case in which one tape is laminated through one lamination operation. In addition, lamination can be performed in various thicknesses in accordance with a formed shape by laminating lamination tapes and thin-layer prepreg tapes in an overlapping manner through one lamination operation.

Figure 11A:
FIG. 11A is a cross-sectional view illustrating an end part shape of a laminated body formed through one lamination operation.
Figure 11B:
FIG. 11B is a cross-sectional view illustrating an end part shape of a laminated body formed through one lamination operation.
Figure 11C:
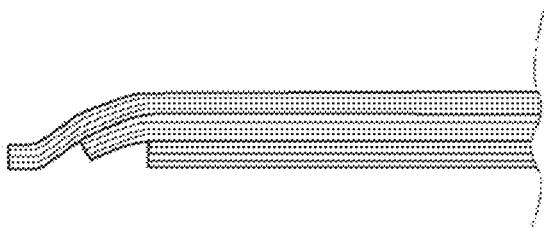
FIG. 11C is a cross-sectional view illustrating an end part shape of a laminated body formed through one lamination operation.

In addition, it is possible to form laminated bodies having thicknesses different from each other by changing the number of tapes laminated during one lamination operation, and it is possible to obtain a laminated body having a more accurate shape by changing the thickness of the laminated body in accordance with a shape into which lamination is performed. FIGS. 11A to 11C are each a cross-sectional view illustrating an end part shape of a laminated body formed through one lamination operation. In FIG. 11A, the lamination positions of end parts of laminated tapes are offset inward by a predetermined length from the lower layer to the upper layer so that the thickness of the end part shape of the laminated body is gradually decreased. In FIG. 11B, the lamination positions are offset to have the end part of the top layer tape at an outermost position so that the end part shape of the laminated body is covered by the top layer tape and the thickness is continuously decreased. In FIG. 11C, the lamination positions of end parts of laminated tapes are offset outward by a predetermined length from the lower layer to the upper layer so that the end part shape of the laminated body is covered by the top layer tape and the thickness is continuously decreased.

Figure 12:
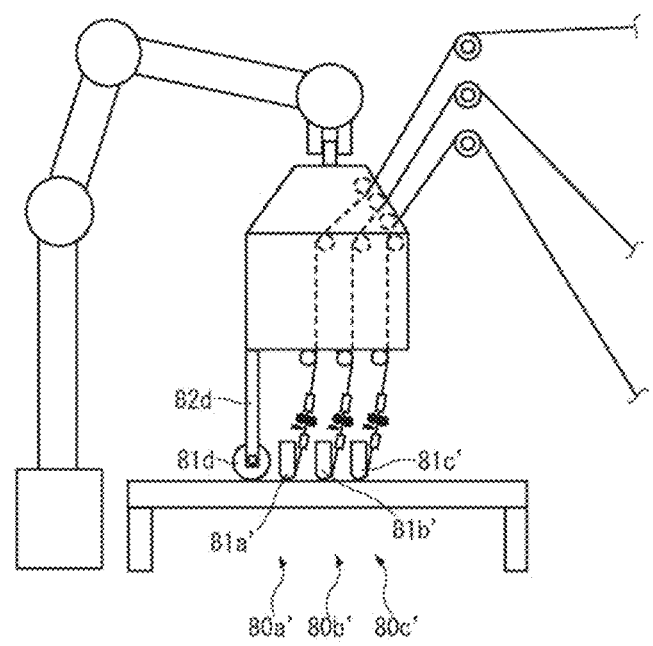
FIG. 12 is a schematic configuration diagram illustrating a modification related to a lamination-shaping unit of the exemplary device illustrated in FIG. 8.

FIG. 12 is a schematic configuration diagram illustrating a modification related to the lamination-shaping unit of the exemplary device illustrated in FIG. 8. In this example, press contact units 81a' to 81c' in place of lamination rollers are attached to tape lamination units 80a' to 80c'. The press contact units 81a' to 81c' each include a press contact member longer than the entire length of a lamination tape and the entire length of a thin-layer prepreg tape in the width direction disposed in parallel in the width direction, and a press contact surface of the press contact member facing the lamination region is formed in a curved surface shape. Thus, each tape is smoothly guided to the lamination region along the press contact surface to have closely contact. Each press contact unit is set to press the press contact member by an elastic member such as a spring so that the press contact surface slidably contacts the lamination region by pressing, and the lamination tape and the thin-layer prepreg tape are temporarily bonded through press bonding to the lamination region.

A lamination roller 81*d* is attached downstream of the tape lamination units 80*a*' to 80*c*' in the lamination operation direction through a support member 82*d*. The lamination roller 81*d* is formed in a cylindrical shape longer than the entire length of the lamination tape and the entire length of the thin-layer prepreg tape in the width direction temporarily bonded through a lamination operation, and reliably bonds the laminated lamination tape and thin-layer prepreg tape through pressurization or heating pressurization. In this manner, the plurality of tapes are collectively bonded by the lamination roller to achieve lamination-shaping after the plurality of tapes are temporarily bonded by the plurality of tape lamination units, and thus the size of the configuration of the shaping head unit can be reduced.

Figure 13:
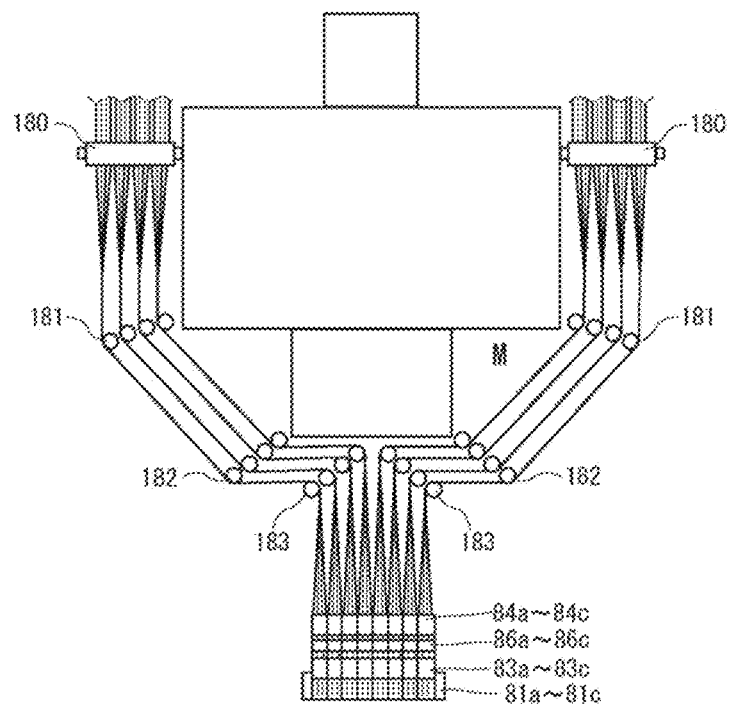
FIG. 13 is a schematic configuration diagram illustrating another modification related to the lamination-shaping unit of the exemplary device illustrated in FIG. 8.

FIG. 13 is a schematic configuration diagram illustrating another modification related to the lamination-shaping unit of the exemplary device illustrated in FIG. 8. In this example, lamination tapes and thin-layer prepreg tapes introduced from the conveyance unit 7 to the lamination-shaping unit 8 pass outside the shaping head unit 80 and are conveyed to the tape lamination units.

A plurality of lamination tapes and thin-layer prepreg tapes conveyed in parallel from the conveyance unit 7 are divided into two and conveyed to a pair of guide rollers 180 attached to both side parts of the support body of the shaping head unit 80, and the lamination tapes and the thin-layer prepreg tapes conveyed in parallel by the guide rollers 180 are individually guided to guide rollers 181 and 182 and conveyed downward from sides of the support body. The guide rollers 181 and 182 are each attached to the support body through an attachment member (not illustrated) so that the axial direction of the rotational axis thereof is aligned with a direction orthogonal to the guide rollers 180, and the lamination tapes and the thin-layer prepreg tapes are guided from the guide rollers 180 to the guide roller 181 in a twisting manner. Thus, the lamination tapes and the thin-layer prepreg tapes are conveyed in substantially parallel to side and lower surfaces of the support body to avoid unintentional contact with the support body.

The lamination tapes and the thin-layer prepreg tapes are guided from the guide roller 182 to the guide roller 183. The guide roller 183 merges the plurality of lamination tapes and thin-layer prepreg tapes conveyed in two from both sides of the support body and guides the plurality of lamination tapes and thin-layer prepreg tapes in parallel in the width direction toward the tape lamination units below. A lamination operation is performed at the tape lamination units as described with reference to FIG. 8.

In the above-described example, one lamination tape and two thin-layer prepreg tapes are supplied to three tape lamination units to perform a lamination operation, but four or more tape lamination units may be attached to the shaping head unit to perform a lamination operation with an increased number of kinds of lamination tapes and thin-layer prepreg tapes.

Thus, one or a plurality of thin-layer tapes supplied separately from a provisional formation step and one or a plurality of lamination tapes formed through the provisional formation step can be sequentially laminated in the lamination region of the basal body surface in an overlapping manner in the lamination operation direction, and the laminated thin-layer tapes and lamination tapes can be integrated and shaped.

In addition, the lamination positions of the tape lamination units can be adjusted to overlap all or some laminated tapes, or the lamination positions can be adjusted so that the tapes are arrayed without overlapping in the width direction to perform a lamination operation, and thus it is possible to significantly increase the degree of freedom of lamination designing in accordance with a formed shape.

Figure 14:
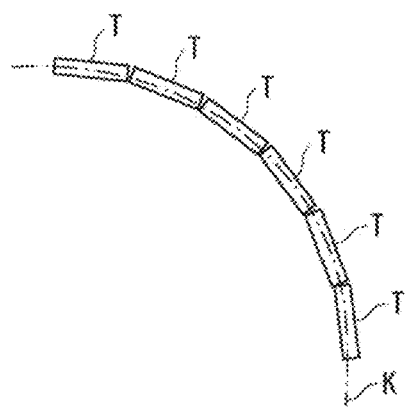
FIG. 14 is an explanatory diagram illustrating exemplary lamination when a lamination region of a basal body surface has a curved surface shape.

FIG. 14 is an explanatory diagram illustrating exemplary lamination when the lamination region of the basal body surface has a curved surface shape. When it is difficult to perform lamination along the curved surface shape of the lamination region due to a bending deformation characteristic of a tape such as a thin-layer tape or a lamination tape, a tape T can be reliably made close contact with the lamination region and bonded and fixed by cutting the tape in accordance with the curvature of a curved surface shape K of the lamination region as illustrated in FIG. 14. For example, the tape is cut at a longer length in a region in which the curvature is small in the lamination region of the basal body surface, or the tape is cut at a shorter length in a region in which the curvature is large, and in this manner, the tape can be made close contact even when the lamination region has a complicate curved surface shape.

Figure 15:
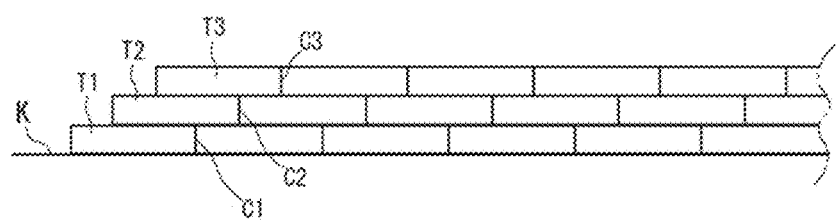
FIG. 15 is an explanatory diagram illustrating exemplary lamination when a plurality of tapes are cut and laminated.

FIG. 15 is an explanatory diagram illustrating exemplary lamination when a plurality of tapes are cut and laminated. In this example, when three tapes $T_1$ to $T_3$ are laminated in accordance with a shape K of the lamination region of the basal body surface, the lamination is performed so that cutting positions $C_1$ to $C_3$ of the respective tapes are not overlapped in the thickness direction. When the cutting positions of the respective tapes are offset in this manner, cut lines of the tapes are not exposed as the entire laminated body, which prevents decrease of the strength of the laminated body due to the tape cutting.

Figure 16:
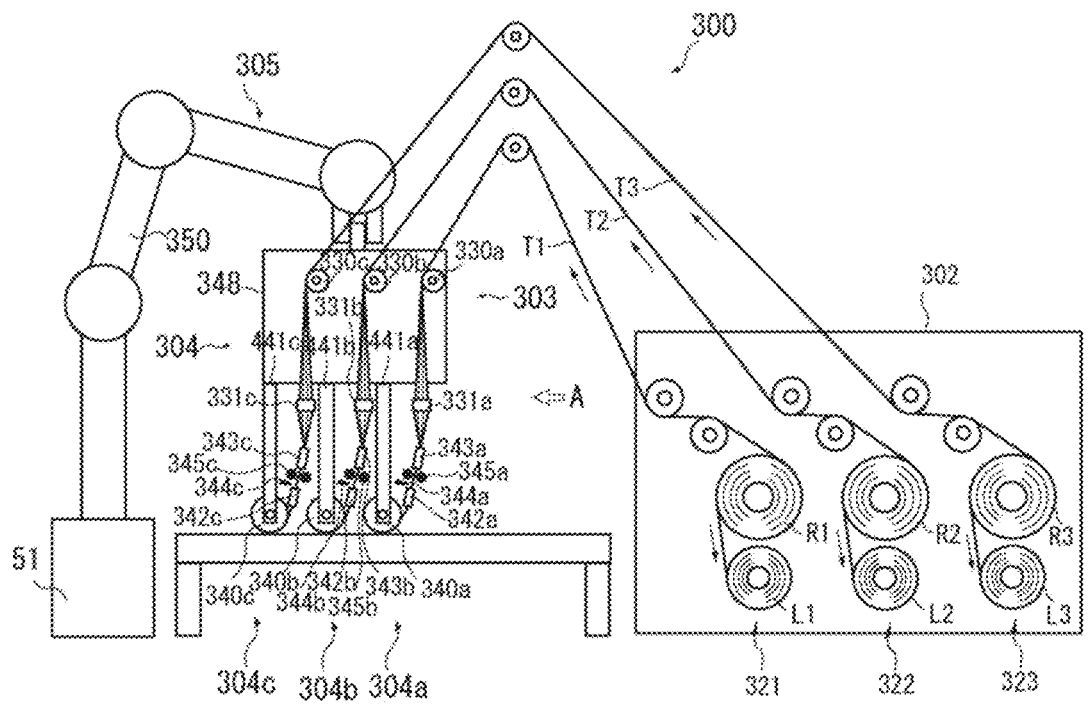
FIG. 16 is a schematic configuration diagram related to a thin-layer prepreg tape lamination device.

FIG. 16 is a schematic configuration diagram related to another embodiment of the thin-layer tape automated lamination device. In the present embodiment, a plurality of thin-layer prepreg tapes are supplied as thin-layer tapes and automatically laminated.

A thin-layer prepreg tape lamination device 300 includes a feeding unit 302 configured to feed a plurality of thin-layer prepreg tapes, a conveyance unit 303 configured to convey the plurality of fed thin-layer prepreg tapes, a lamination head unit 304 that includes a plurality of tape lamination units 304*a* to 304*c* arrayed in the lamination operation direction and is configured to introduce the plurality of conveyed thin-layer prepreg tapes to the respective tape lamination units 304*a* to 304*c* and bond the tapes in the lamination region of the basal body surface, and a movement unit 305 configured to move the lamination head unit 304 relative to the lamination region.

In this example, the lamination device 300 includes an adjustment unit 348 configured to adjust the positions of the tape lamination units 304*a* to 304*c* in the width direction of the thin-layer prepreg tapes. The adjustment unit 348 can adjust the lamination positions of the tape lamination units 304a to 304c to overlap entirely or partially the thin-layer prepreg tapes or adjust the lamination positions to array the tapes without overlapping in the width direction, thereby performing a lamination operation.

The feeding unit 302 includes feeding units 321, 322, and 323 in which the rolls R1 to R3 obtained by winding the thin-layer prepreg tapes T1 to T3, respectively, are set to a plurality of bobbins attached to a support frame body (not illustrated) such as a creel stand. The thin-layer prepreg tapes T1 to T3 are unreeled from the rolls R1 to R3 and fed from the feeding units 321 to 323 while release sheets bonded to surfaces thereof on one side are peeled and wound around the winding rolls L1 to L3.

The thin-layer prepreg tapes T1 to T3 fed from the feeding unit 302 are conveyed to the lamination head unit 304 by the conveyance unit 303. The conveyance unit 303 conveys the thin-layer prepreg tapes T1 to T3 to the tape lamination units 304a to 304c, respectively, in parallel and includes conveyance rollers 330a to 330c attached to a side part of the adjustment unit 348, and adjustment rollers 331a to 331c attached to a lower part of the adjustment unit 348. The conveyance rollers 330a to 330c convey the thin-layer prepreg tapes T1 to T3 fed from the feeding unit 302 downward from the side part of the adjustment unit 348, and the adjustment rollers 331a to 331c guide the thin-layer prepreg tapes T1 to T3 being conveyed downward so that the tapes are pulled toward the lower surface of the adjustment unit 348 and introduced toward the tape lamination units 304a to 304c in a twisting manner.

Figure 17:
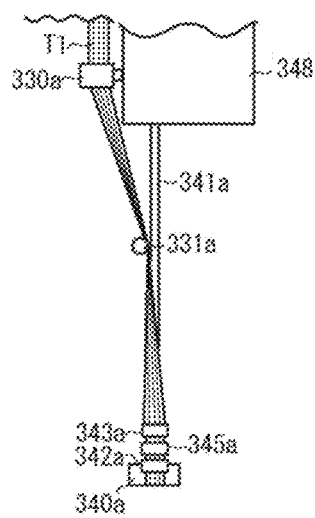
FIG. 17 is a partially enlarged view illustrating a conveyance operation of a conveyance roller and an adjustment roller when viewed in the direction of arrow A illustrated in FIG. 16.

FIG. 17 is a partially enlarged view illustrating a conveyance operation by the conveyance roller 330a and the adjustment roller 331a when viewed in the direction of arrow A illustrated in FIG. 16. The direction of arrow A indicates the lamination operation direction of the lamination head unit 304. The adjustment roller 331a is disposed upstream of the tape lamination unit 304a in the thin-layer prepreg tape conveyance direction, and the conveyance roller 330a is disposed upstream of the adjustment roller 331a in the thin-layer prepreg tape conveyance direction.

The position of the adjustment roller 331a is adjusted to introduce the thin-layer prepreg tape T1 in the lamination operation direction of the tape lamination unit 304a, and thus the thin-layer prepreg tape T1 conveyed downward by the conveyance roller 330a can be reliably introduced toward the tape lamination unit 304a. Similarly to the conveyance roller 330a and the adjustment roller 331a, the conveyance roller 330b and the adjustment roller 331b, and the conveyance roller 330c and the adjustment roller 331c are set to perform the conveyance operation.

A thin-layer prepreg tape has a high drape characteristic, and thus is hardly damaged when rotated about an axis along the tape length direction and deformed in twist. In addition, the conveyance direction of the thin-layer prepreg tape T1 extended around the adjustment roller 331a can be easily changed in a circumferential direction orthogonal to the axial direction (in FIG. 2, a direction orthogonal to the sheet) of the rotational axis of the adjustment roller 331a. Thus, when the axial direction of the adjustment roller 331a is set to be a direction orthogonal to the position adjustment direction (direction along the sheet) of the tape lamination unit 304a, the width direction of the thin-layer prepreg tape T1 extended around the adjustment roller 331a is orthogonal to the position adjustment direction, and accordingly, the conveyance direction of the thin-layer prepreg tape T1 is easily changed to follow an operation to adjust the position of the tape lamination unit 304a. In this manner, a stable introduction operation can be performed while the thin-layer prepreg tape follows the position adjustment of the lamination head unit 304.

In addition, since the tape lamination units 304a to 304c are arrayed in the lamination operation direction, the attachment position of the adjustment roller 331a is restricted so that the thin-layer prepreg tape is introduced to the tape lamination unit 304a in the lamination operation direction. Thus, when the conveyance roller 330a is attached to the side part of the adjustment unit 348 on the position adjustment direction side of the adjustment roller 331a, the conveyance direction from the adjustment roller 331a to the conveyance roller 330a can be set to be a direction off the lamination operation direction, and thus a plurality of thin-layer prepreg tapes can be smoothly introduced even with a configuration in which a plurality of tape lamination units are arrayed at a narrow interval.

The tape lamination units 304a to 304c are disposed at a predetermined interval in the lamination operation direction, and the lamination head unit 304 laminates thin-layer prepreg tapes at a plurality of lamination positions arrayed in the lamination operation direction. Then, the thin-layer prepreg tapes T1 to T3 conveyed from the conveyance unit 303 are sequentially laminated in the lamination region of the basal body surface and bonded and integrated through heating pressurization. Thus, the three thin-layer prepreg tapes can be simultaneously laminated at the plurality of lamination positions through one lamination operation, which improves the operation efficiency. In addition, the thickness of lamination-shaping can be finely set by changing the number of thin-layer prepreg tapes to be laminated.

The tape lamination units 304a to 304c include tape lamination rollers 340a to 340c configured to bond and integrate the laminated thin-layer prepreg tapes T1 to T3 through pressurization or heating pressurization, support members 341a to 341c configured to support the respective tape lamination rollers 340a to 340c, pairs of guiding units 342a to 342c and 343a to 343c disposed upstream of the tape lamination rollers 340a to 340c in the conveyance direction to guide the thin-layer prepreg tapes T1 to T3, cutters 344a to 344c configured to cut the thin-layer prepreg tapes T1 to T3 disposed between the respective pairs of guiding units 342a to 342c and 343a to 343c, and nip rollers 345a to 345c disposed upstream of the cutters 344a to 344c in the conveyance direction. Gaps through which the thin-layer prepreg tapes T1 to T3 can pass are formed inside the guiding units 342a to 342c and 343a to 343c, and the tape surfaces can be set along the lamination surface of the lamination region as the thin-layer prepreg tapes T1 to T3 pass through the gaps.

The thin-layer prepreg tapes T1 to T3 are conveyed from a conveyance unit 33 into the respective nip rollers 345a to 345c, and then rotate the nip rollers 345a to 345c and are conveyed while being sandwiched between the nip rollers. The conveyed thin-layer prepreg tapes T1 to T3 pass through the guiding units 342a to 342c and 343a to 343c and are guided toward the tape lamination rollers 340a to 340c and each introduced between the lamination region of the basal body surface and the corresponding one of the tape lamination rollers 340a to 340c. The tape lamination units 304a to 304c are moved in accordance with the speed of introduction of the thin-layer prepreg tapes T1 to T3 and thereby the thin-layer prepreg tapes T1 to T3 are bonded and fixed in the lamination region by pressing. When the thin-layer prepreg tapes T1 to T3 are to be laminated by a predetermined length in accordance with a shape to be formed, the thin-layer prepreg tapes T1 to T3 are cut by the cutters 344a to 344c while the nip rollers 345a to 345c perform a conveyance operation by the predetermined length, and thus the thin-layer prepreg tapes T1 to T3 having the predetermined length can be accurately laminated.

The adjustment unit 348 adjusts the lamination positions of the tape lamination units 304a to 304c while supporting the tape lamination units 304a to 304c, and also adjusts the positions of the adjustment rollers 331a to 331c in accordance with the adjustment of the lamination positions of the tape lamination units 304a to 304c.

The movement unit 305 includes a multi-joint arm unit 350 configured to move the lamination head unit 304, and a drive unit 351 configured to control drive of the multi-joint arm unit 350. The multi-joint arm unit 350 is driven by the drive unit 351 to move the lamination head unit 304 relative to the basal body surface, and the lamination head unit 304 positions the tape lamination units 304a to 304c in the lamination region in accordance with the movement operation and performs a lamination operation.

For example, the adjustment unit 348 performs lamination position adjustment in a direction (the width direction of laminated thin-layer prepreg tapes) orthogonal to the lamination operation direction so that the tape lamination units 304a to 304c are arrayed in the lamination operation direction, thereby performing setting for a lamination operation through which the thin-layer prepreg tapes T1 to T3 are entirely or partially overlapped with each other or a lamination operation through which the thin-layer prepreg tapes T1 to T3 are arrayed without overlapping in the width direction.

Figure 18A:
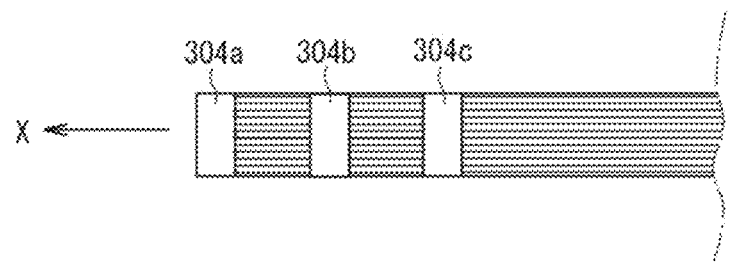
FIG. 18A is an explanatory diagram related to the lamination operation of the tape lamination unit.
Figure 18B:
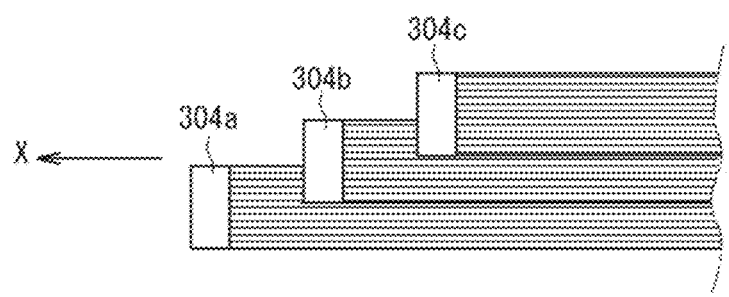
FIG. 18B is an explanatory diagram related to the lamination operation of the tape lamination unit.
Figure 18C:
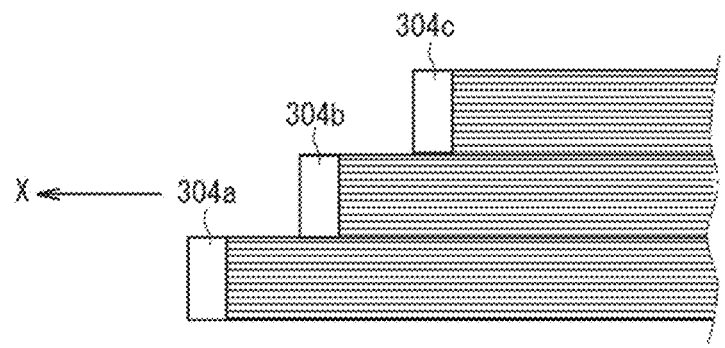
FIG. 18C is an explanatory diagram related to the lamination operation of the tape lamination unit.

FIGS. 18A to 18C are each an explanatory diagram related to a lamination operation of the tape lamination units 304a to 304c. In FIG. 18A, the lamination positions of the tape lamination units 304a to 304c are adjusted to be arrayed in a lamination operation direction Y so that all thin-layer prepreg tapes are overlapped with each other. In FIG. 18B, the lamination positions of the tape lamination units 304a to 304c are adjusted to be offset from each other by a predetermined width in the width direction of the thin-layer prepreg tapes so that the thin-layer prepreg tapes are partially overlapped with each other. In FIG. 18C, the lamination positions of the tape lamination units 304a to 304c are adjusted to be offset from each other by the tape width in the width direction of the thin-layer prepreg tapes so that the thin-layer prepreg tapes are arrayed without overlapping.

In this manner, the thickness and lamination range of thin-layer prepreg tapes laminated through one lamination operation can be adjusted by adjusting the lamination positions of the tape lamination units 304a to 304c. In addition, lamination can be performed at a tilt relative to the lamination operation direction by moving the tape lamination units in the width direction during a lamination operation, and can be finely adjusted to change an overlapping part in accordance with the shape of the basal body surface.

Figure 19A:
FIG. 19A and FIG. 19B are an explanatory diagram related to a lamination operation with lamination position adjustment.
Figure 19B:
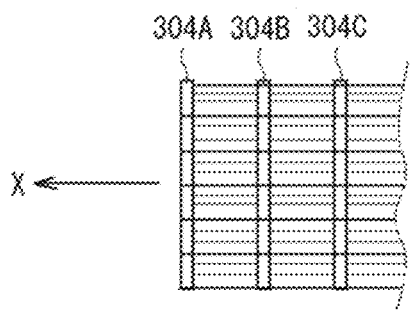
Figure 20A:
FIG. 20A and FIG. 20B are an explanatory diagram related to a lamination operation with lamination position adjustment.
Figure 20B:
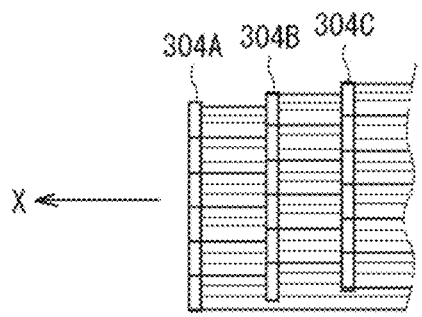

In the case of tape lamination units configured to array a plurality of thin-layer tapes in the width direction and bond the arrayed tapes all at once as described with reference to FIGS. 8 and 9, as well, the lamination positions may be adjusted to perform a lamination operation. FIGS. 19 to 21 are each an explanatory diagram related to a lamination operation with lamination position adjustment. FIGS. 19A, 20A, and 21A are each a pattern diagram illustrating a laminated section in the thickness direction, and FIGS. 19B, 20B, and 21B are each an explanatory diagram illustrating a lamination state obtained through a lamination operation by the tape lamination units 304a to 304c. The tape lamination units 304a to 304c array a plurality of thin-layer tapes in the width direction and bond the arrayed tapes all at once. In FIG. 19, the tape lamination units 304a to 304c are arrayed at a predetermined interval in a lamination operation direction X, and the lamination positions are adjusted in the width direction so that laminated thin-layer prepreg tapes are completely overlapped with each other. In FIG. 20, the lamination positions of the tape lamination units 304a to 304c are adjusted so that laminated thin-layer prepreg tapes are offset in the width direction and partially overlapped with each other. When lamination-shaping is performed in this manner, border lines of the thin-layer prepreg tapes are offset from each other between layers, and accordingly, a lamination-shaped object that is homogenous in strength as compared to a case in which the border lines are aligned with each other between layers can be obtained. In FIG. 21, the lamination positions of multi-lamination units 304A to 304C are adjusted so that laminated thin-layer prepreg tapes are not overlapped with each other, and thus lamination can be performed in the lamination region of a wider range through one lamination operation, which improves the operation efficiency.

Even when position adjustment is performed, thin-layer prepreg tapes can be stably conveyed by adjusting the positions of the adjustment rollers 331a to 331c through movement in the same direction in accordance with adjustment of the lamination positions of the tape lamination units 304a to 304c. To adjust the positions of the tape lamination units and the adjustment rollers, for example, an adjustment screw member in a bar shape is erected in the adjustment unit 348, an attachment member is screwed to the adjustment screw member to allow position adjustment, and support members supporting the respective tape lamination units and adjustment rollers are attached and fixed to the attachment member. As the adjustment screw member is rotated, the attachment member moves in the axial direction of the adjustment screw member and position adjustment is performed, and accordingly, the lamination positions of the tape lamination units and the positions of the adjustment rollers are accurately adjusted.

In the example illustrated in FIGS. 8 and 9, a plurality of thin-layer tapes are bonded all at once by lamination rollers, but a tape lamination roller may be attached for each thin-layer tape and included in a tape lamination unit so that the thin-layer tape can be individually laminated. FIG. 22 is a schematic configuration diagram illustrating an exemplary mechanism configured to adjust the lamination positions of a plurality of thin-layer tapes arrayed in the width direction. The drawing illustrates an exemplary interval adjustment mechanism for adjusting the interval between a plurality of tape lamination units disposed in parallel. An adjustment unit 348' includes a rotation body 348a' in a cylindrical shape, a rotational shaft body 348b' pivotally supporting the rotation body 348a', a plurality of interval adjustment grooves 348c' formed on the surface of the rotation body 348a', and a plurality of support bodies 348d' slidably engaged with the respective interval adjustment grooves 348c'.

The interval adjustment grooves 348c' are formed to move the support bodies 348d' in the axial direction of the rotational shaft body 348b' while the interval between the support bodies 348d' is increased and decreased by an equal interval. The support bodies 348d' is regulated to move only in the axial direction of the rotational shaft body 348b' by a guide bar 348e', and thus the rotation body 348a' can be rotated to move the support bodies 348d' while being held at the equal interval.

Such an interval adjustment mechanism may be a mechanism other than that above-described and is not particularly limited. For example, support bodies may be attached to a pivotally support part of a link mechanism used for a "magic hand" or the like to allow expansion and contraction of the link mechanism, thereby adjusting the interval between the support bodies while maintaining the interval equal among the support bodies.

The rotation body 348a' is attached to the rotational shaft body 348b' and movable along the central axis so that the position thereof can be adjusted in the axial direction. Tape lamination units are attached to the respective support bodies 348d', and in FIG. 19, a plurality of tape lamination units are attached to the respective support bodies 348d'. Thus, the lamination positions of the tape lamination units supported by the support bodies 348d' are adjusted all at once through position adjustment of the rotation body 348a' in the axial direction. The interval between the tape lamination units is adjusted through a rotation operation of the rotation body 348a' so that the lamination positions of the tape lamination units are adjusted.

In this manner, a plurality of thin-layer prepreg tapes can be simultaneously laminated by a plurality of tape lamination units through one lamination operation of the lamination head unit 304, and the operation efficiency can be significantly improved as compared to a case in which each thin-layer prepreg tape is laminated through one lamination operation. The lamination can be performed in various thicknesses in accordance with a formed shape by laminating thin-layer prepreg tapes in an overlapping manner through one lamination operation.

The adjustment unit 348 can set each of the tape lamination units 304a to 304c to an operational position or a wait position, and the tape lamination units 304a to 304c contact the lamination region and perform a lamination operation when set to the operational position, or stop the lamination operation when set to the wait position separated from the lamination region. Thus, the thickness of lamination can be finely set by setting the tape lamination units to the operational position or the wait position as appropriate in accordance with the number of tapes to be laminated. In addition, it is possible to partially change the number of laminated tapes in accordance with a curved surface shape to be formed by changing the length of lamination for each tape lamination unit and perform lamination-shaping, and it is also possible to reduce, as much as possible, an unnecessary part to be removed after the lamination-shaping. To set each tape lamination unit to the operational position and the wait position, for example, the support member supporting the tape lamination unit may be formed by two members coupled with each other through a joint member, and the joint member may be rotated by a drive unit such as a small-sized motor, thereby performing the position setting.

In a laminated body obtained by simultaneously laminating a plurality of thin-layer prepreg tapes through a lamination operation, the laminated body are laminated with reinforcement fiber materials being aligned in each thin-layer prepreg tape, and the disorder of the reinforcement fiber materials in the thickness direction is small and straightness of the reinforcement fiber materials is improved as compared to a conventional prepreg tape having the same thickness. Thus, the laminated body is excellent in mechanical characteristics such as tensile and bending characteristics as compared to the conventional prepreg tape having the same thickness. In addition, the laminated body having a thickness equal to that of the conventional prepreg tape is laminated through one lamination operation, and thus a high-quality laminated body can be shaped at operation efficiency same as that for the conventional prepreg tape.

In addition, a thin-layer prepreg tape has excellent drape characteristics, can be deformed along the shape of the lamination region of the basal body surface, and can flexibly deal with deformation such as bend and torsion occurred in conveyance and return to the original shape, and thus a high-quality laminated body can be shaped with the tapes. Accordingly, in a conveyance unit and a lamination head unit, conveyance can be easily performed in accordance with position adjustment of the lamination head unit, and the degree of designing freedom of arraying components is increased, and thus a plurality of components can be efficiently disposed in a small space to reduce the size of the device.

REFERENCE SIGNS LIST

1 . . . thin-layer tape automated lamination device, 2 . . . provisional formation unit, 3 . . . lamination-shaping unit, 4 . . . conveyance unit, 10 . . . automated lamination device, 5 . . . feeding unit, 6 . . . provisional formation unit, 7 . . . conveyance unit, 8 . . . lamination-shaping unit, 300 . . . thin-layer prepreg tape lamination device, 302 . . . feeding unit, 303 . . . conveyance unit, 304 . . . lamination head unit, 305 . . . movement unit

The invention claimed is:

1. A thin-layer tape automated lamination method comprising:
   a provisional formation step of forming lamination tapes having thicknesses different from each other by laminating a plurality of thin-layer prepreg tapes each having a thickness of 20 μm to 80 μm in a resin impregnation state, the plurality of thin-layer prepreg tapes including a base thin-layer pre-preg tape and a plurality of other thin-layer pre-preg tapes;
   a conveyance process of conveying a formed lamination tape of the lamination tapes; and
   a lamination-shaping step of laminating and shaping the conveyed lamination tape in a lamination region of a basal body surface,
   wherein the provisional formation step forms the lamination tape by cutting sheets of the other thin-layer prepreg tapes to the same or different lengths, and laminating the cut other thin-layer prepreg tapes on the base thin-layer prepreg tape.

2. The thin-layer tape automated lamination method according to claim 1, wherein the lamination-shaping step laminates and shapes the formed lamination tape in the lamination region of the basal body surface.

3. The thin-layer tape automated lamination method according to claim 1, wherein the provisional formation step forms the lamination tape by laminating the thin-layer prepreg tapes and resin tapes.

4. The thin-layer tape automated lamination method according to claim 1, wherein the conveyance process adjusts conveyance of the lamination tape in accordance with a lamination operation in the lamination-shaping step.

* * * * *